United States Patent
Lombardi et al.

(10) Patent No.: US 7,631,608 B1
(45) Date of Patent: Dec. 15, 2009

(54) UNDERWATER CABLE CUTTER APPARATUS

(75) Inventors: Tammy Lombardi, Carlsbad, CA (US); Samuel R. Bona, La Mesa, CA (US); Steve Whiteside, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 430 days.

(21) Appl. No.: 11/513,430

(22) Filed: Aug. 25, 2006

(51) Int. Cl.
*B63B 9/00* (2006.01)

(52) U.S. Cl. .................................. 114/221 A; 405/156

(58) Field of Classification Search ............. 114/221 A; 30/90.1, 92, 180; 405/156
See application file for complete search history.

(56) References Cited

U.S. PATENT DOCUMENTS

| | | | | |
|---|---|---|---|---|
| 1,915,435 | A | * 6/1933 | Miller | 114/221 A |
| 3,763,738 | A | * 10/1973 | Temple | 114/221 A |
| 4,016,728 | A | 4/1977 | Mason | |
| 4,020,780 | A | 5/1977 | Shumaker et al. | |
| 4,040,376 | A | 8/1977 | Giebel | |
| 4,120,246 | A | 10/1978 | Sabranski et al. | |
| 4,128,071 | A | 12/1978 | Layman et al. | |
| 4,463,496 | A | * 8/1984 | Reich et al. | 114/221 A |
| 4,805,547 | A | 2/1989 | Matsuzaki et al. | |
| 5,042,413 | A | 8/1991 | Benoit | |
| 5,419,272 | A | 5/1995 | Backstein et al. | |
| 6,038,807 | A | 3/2000 | Taylor | |
| 6,397,948 | B1 | 6/2002 | Williams et al. | |

OTHER PUBLICATIONS

Hi-Shear Technology Corporation (Web Catalog) 24225 Garnier St. Torrance 90505-5355: 2 Pages Cable & Bolt Cutter Mod SL1034 PN9361529-1.
Hi-Shear Technology Corporation (Web Catalog) 24225 Garnier St. Torrance 90505-5355: 2 Pages Cable & Bolt Cutter Mod SL 1056 PN9364262.
Hi-Shear Technology Corporation (Web Catalog) 24225 Garnier St. Torrance 90505-5355: 2 Pages Mini Cable & Bolt Cutter SL 1056-6 PN65236.
Hi-Shear Technology Corporation (Web Catalog) 24225 Garnier St. Torrance 90505-5355: 2 Pages Cable & Bolt Cutter SL 1063 PN9364221-1.
Hi-Shear Technology Corporation (Web Catalog) 24225 Garnier St. Torrance 90505-5355: 6 Pages Product Line Summary Cable & Rod Cutter (SL Series).

* cited by examiner

*Primary Examiner*—Lars A Olson
(74) *Attorney, Agent, or Firm*—Kyle Eppele; Peter A. Lipovsky

(57) ABSTRACT

An apparatus for cutting an underwater cable, wire or line is provided. The apparatus includes a body with a lid and a base. A piston is located, within the body, and a piston rod is coupled to the piston. An elongate lever cutting element is pivotally coupled to a distal end of the piston rod and also pivotally coupled to the base. Upon actuation, water is introduced through the lid and into the body, moving the piston and piston rod, which actuates the elongate lever cutting element. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

7 Claims, 4 Drawing Sheets

UNDERWATER CABLE CUTTER APPARATUS

FEDERALLY-SPONSORED RESEARCH AND DEVELOPMENT

This invention (Navy Case No. 97355) was developed with finds from the United States Department of the Navy. Licensing inquiries may be directed to Office of Research and Technical Applications, Space and Naval Warfare Systems Center, San Diego, Code 2112, San Diego, Calif. 92152; telephone (619) 553-2778; email: T2@spawar.navy.mil.

BACKGROUND

This invention relates generally to cable cutters. More specifically, but without limitation thereto, this invention relates to an underwater cable cutter that uses water pressure to cut a cable underwater.

The design and use of cable cutters for ocean environments has become of increasing importance to marine engineering. Presently, the use of such cutters is desired for all depths of the world's oceans. Cable cutters are of great interest to the U.S. Navy. One major Navy application is in minesweeping operations.

The design and construction of cable cutters fall within a wide area of engineering disciplines. The general method for cable cutting is a mechanical technique usually involving severing a cable or wire placed between an anvil and a cutter. In some cases scissor-like devices are used. Operation of the cable cutter has included direct, hands-on, manipulation by a diver as well as remote operation of a cutter. Mechanical and explosive techniques are common. Generally, such cable cutters have been designed to be expendable in that they are to be used only once and/or are allowed to be lost or destroyed when operated.

Originally, cable cutters were designed mostly for cutting simple wire ropes and electrical cables. Modern state-of-the-art electrical cable construction however has resulted in the use of KEVLAR as a strength member. KEVLAR is a tough synthetic fiber that is usually difficult to cut by ordinary scissor mechanisms. Consequently, many new designs for various types of cable cutters have been presented. These generally incorporate powerful anvil/cutter blade mechanisms.

Cable cutters designed for use at great ocean depths have been required to be heavy and bulky in order to protect certain pressure sensitive components from high hydrostatic pressures.

This is particularly true where hydraulic systems are used to provide a powerful cutting force. Therefore, there remains a need to overcome one or more of the limitations in the above-described art.

SUMMARY

An underwater cable cutter apparatus ("cable cutter") comprises an apparatus for cutting a cable, wire or other line located underwater. The apparatus includes a body with a lid and a base. A piston is located within the body, and a piston rod is coupled to the piston. A cutting element is pivotally coupled to a distal end of the piston rod and also pivotally coupled to the base. Upon actuation, water is introduced through the lid and into the body, moving the piston and piston rod and thereby operating the cutting element. The cable, wire or line to be cut is positioned in a cable holder, and the cutting element cuts the cable, wire or line when operated by the piston rod.

A feature of the cable cutter is that it is actuated by water pressure. That is, the cable cutter severs cables, wires or other types of lines that are underwater by using only the surrounding water pressure to generate the force required to cut the cable.

These and other features and advantages will be appreciated from review of the following Description, along with the accompanying figures in which like reference numerals are used to describe the same, similar or corresponding parts in the several views of the drawings.

It will be recognized that some or all of the Figures are schematic representations for purposes of illustration and do not necessarily depict the actual relative sizes or locations of the elements shown. The Figures are provided for the purpose of illustrating one or more embodiments with the explicit understanding that they are offered by way of example only and are not intended to limit the scope of the invention.

DESCRIPTION

Figure 1:
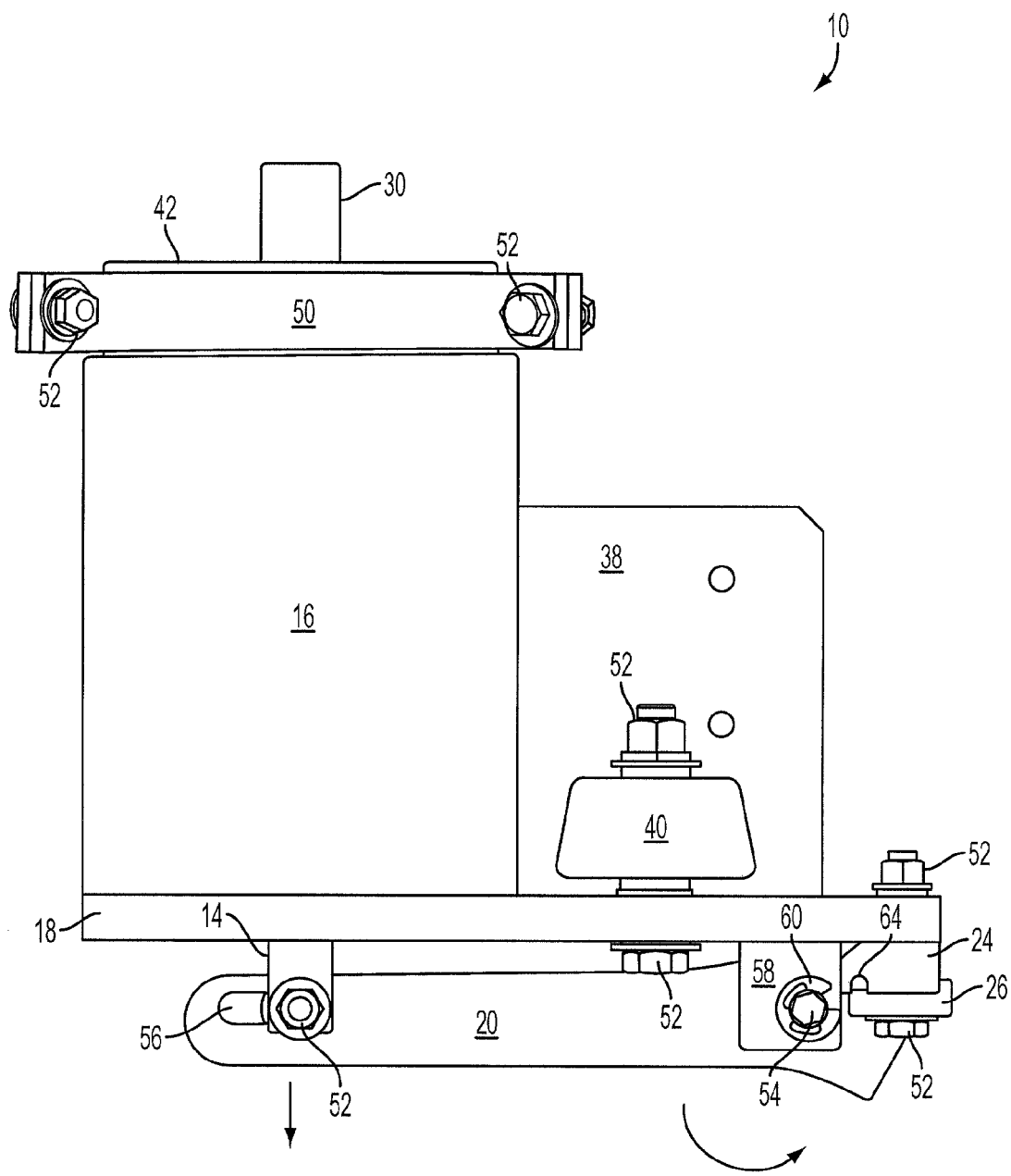
FIG. 1 is an elevation view of a representative embodiment of the underwater cable cutter described herein.
Figure 2:
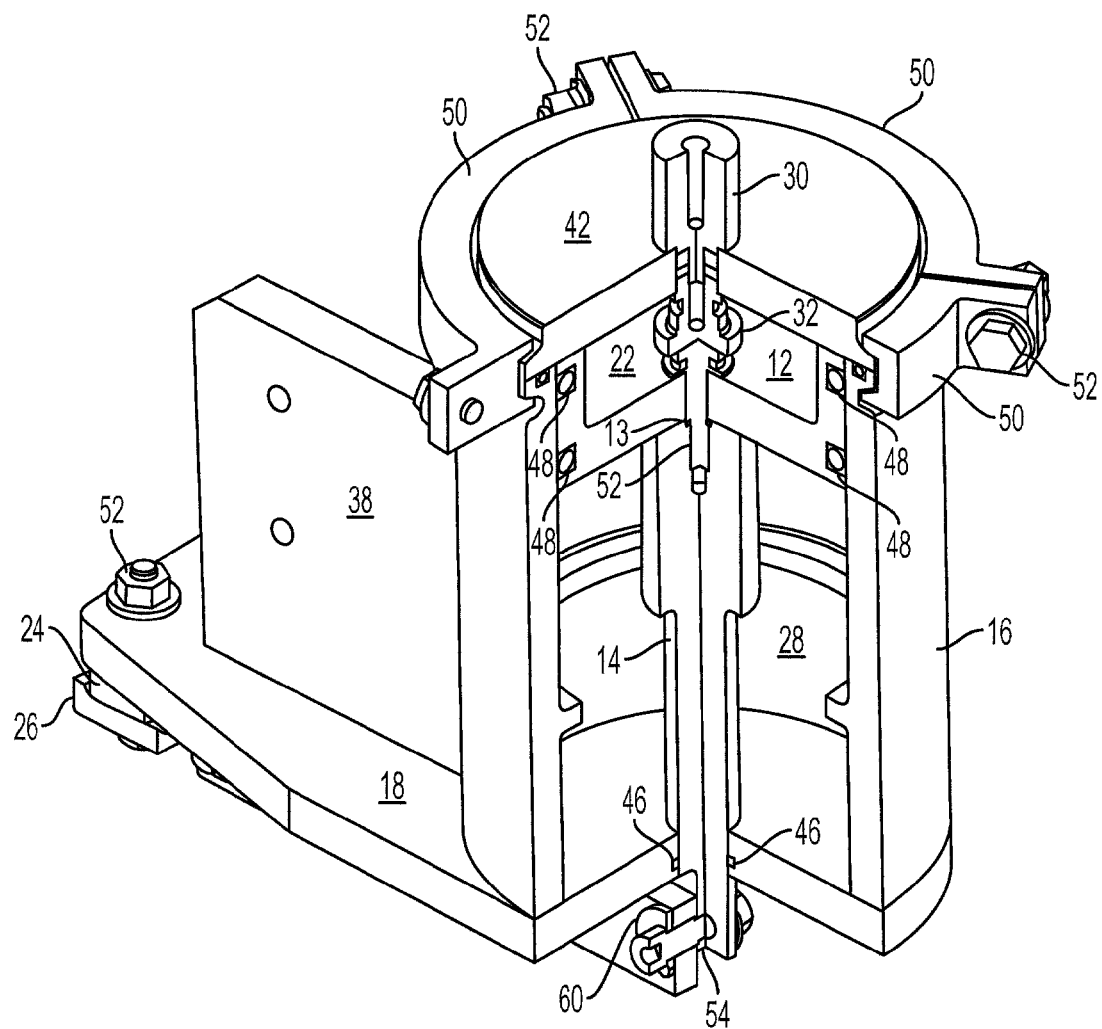
FIG. 2 is a cut away view of the underwater cable cutter of FIG. 1.
Figure 3:
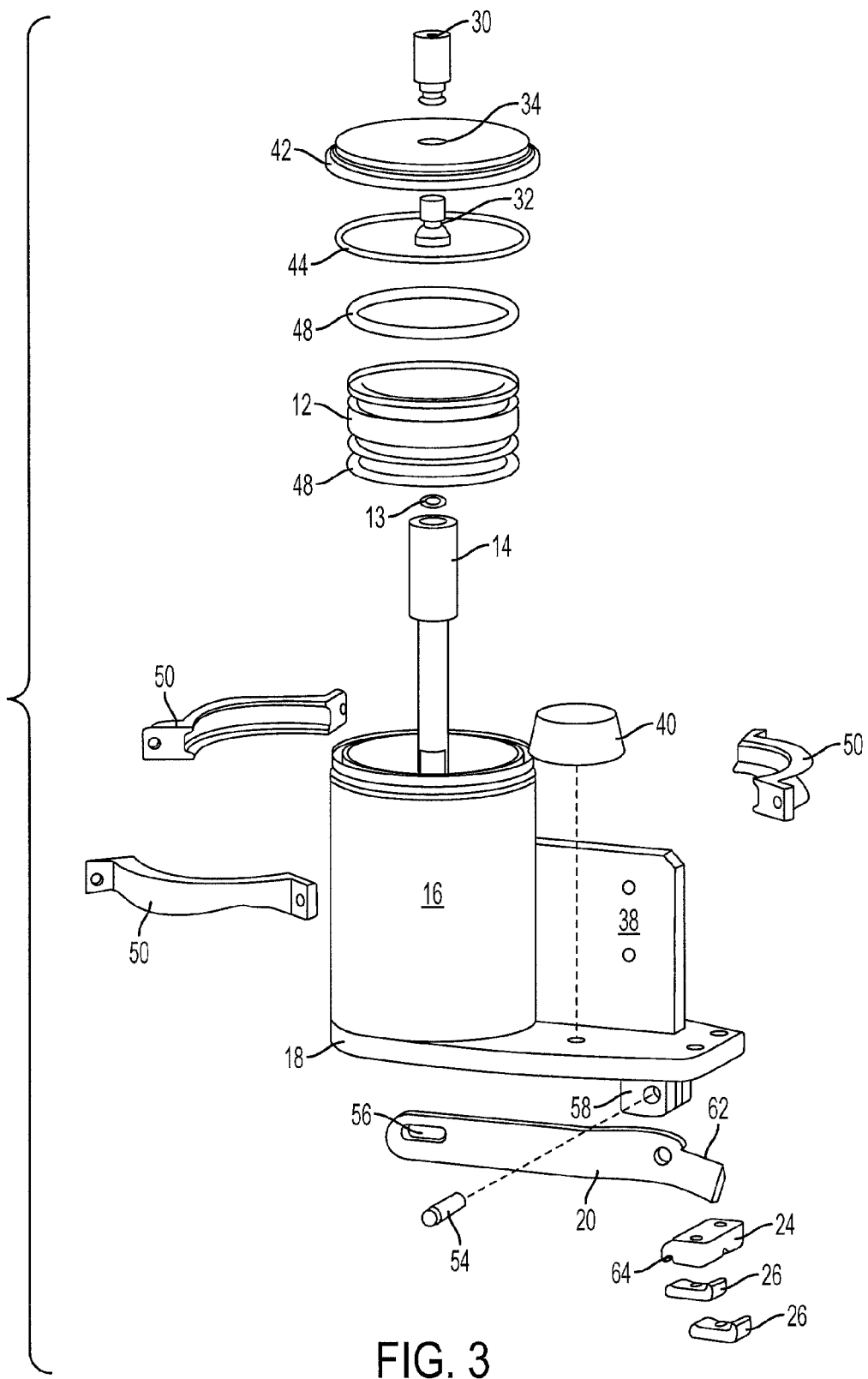
FIG. 3 is an exploded view of the underwater cable cutter of FIGS. 1 and 2.
Figure 4:
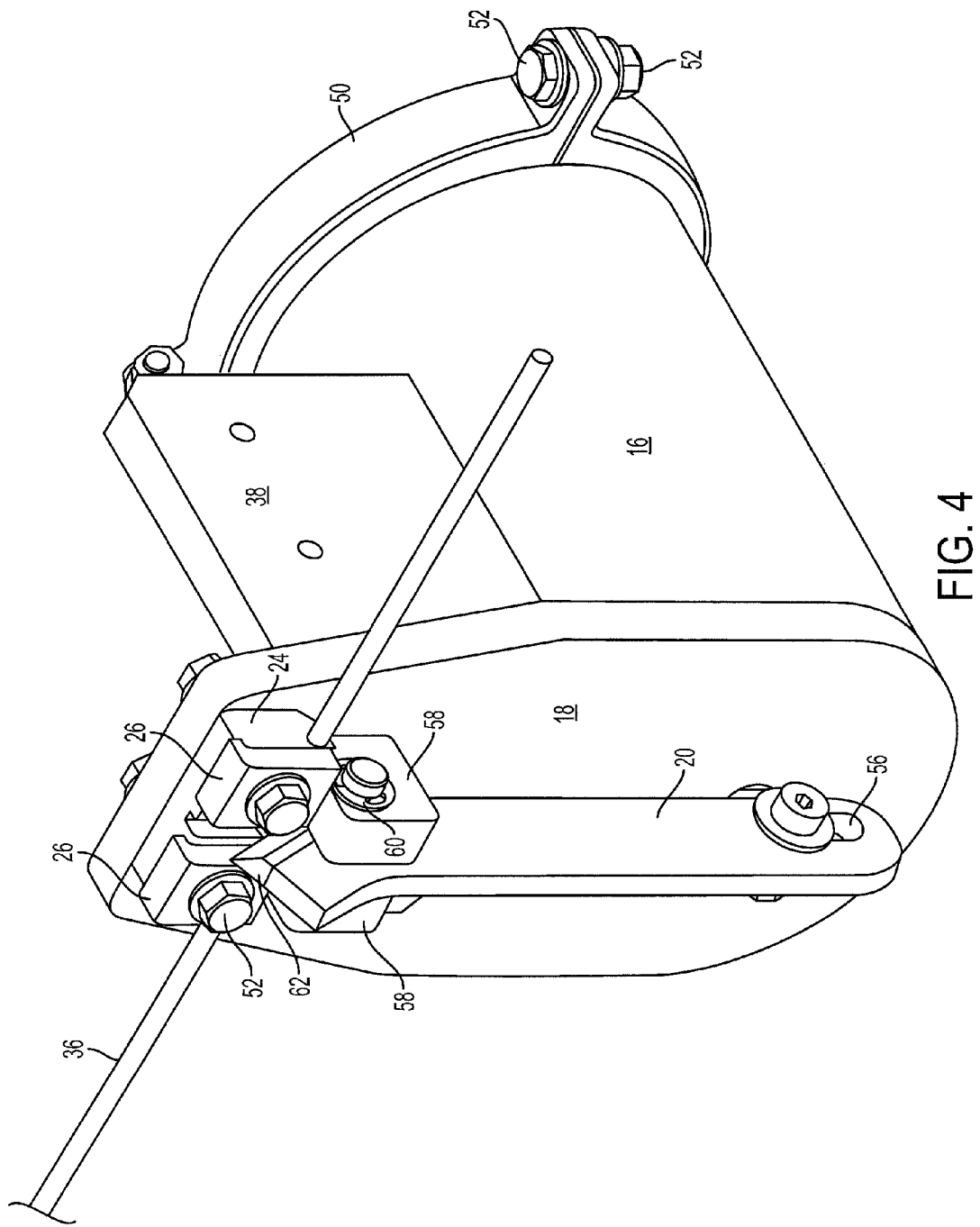
FIG. 4 is a perspective view of the underwater cable cutter of FIGS. 1, 2 and 3.

Referring now to FIGS. 1-4, an underwater cable cutter 10 is illustrated. Underwater cable cutter 10 uses a piston 12, shown in FIGS. 2 and 3, that is connected to a piston rod 14 with a seal 13 located therebetween. These are contained in a body 16 that in one embodiment comprises a hollow cylindrical housing. As shown in FIGS. 1 and 2, a portion of piston rod 14 extends out of a base 18, shown attached to body 16. Body 16 is originally filled with air such as at sea level pressure. The extending end of piston rod 14 is pivotally attached to a cutting element 20, which in one embodiment comprises an elongate lever member having a cutting surface at one end. When positioned underwater and actuated, water enters a water chamber 22 (see FIG. 2) and impinges upon piston 12, thereby translationally moving piston rod 14 and in turn causing elongate lever cutting element 20 to cut a cable 36 (FIG. 4). Cable 36 is held by a cable holder 24 and cable lock 26.

Because the density of water is over 800 times greater than the density of air (at standard temperature and pressure), it will be appreciated that a substantial cutting force can be generated by immersing the cable cutter 10 in only a relatively small depth of water. Besides originally providing body 16 with sea level air pressure, the air located within the interior of the body 16 may be initially eliminated, or substantially eliminated, creating a vacuum, or partial vacuum. Such a low pressure environment can be selected for just that part of cutter 10 identified in the figure as air chamber 28. Thus an even greater pressure differential can be selected to exist between the interior of the body 16 and the exterior of the body 16.

The cutting process is initiated by removing either an exterior actuator 30 or an interior actuator 32 from lid aperture 34. An O-ring, D-ring or other suitable sealing element is positioned between the actuators 30/32 and lid aperture 34 to seal against water from entering the water chamber 22 when the actuators 30/32 are in position. Once actuator 30 or 32 is removed, water flows into water chamber 22 and pushes upon piston 12. Because the volume on the other side of the piston 12, shown in FIG. 2 as air chamber 28, contains typically air at sea level pressure or less, the force generated by the incoming water moves the piston 12 and its attached piston rod 14 to thereby actuate cutting element 20 and cut cable 36, shown in FIG. 4. It will be appreciated the cable 36 may be a wire rope, electrical cable, or other type of line, wire, or cable.

As shown in FIGS. 2 and 3, underwater cable cutter 10 is partially constructed of housing or body 16 that includes attached base 18 though which piston rod 14 extends. Body 16 also includes a deployment flange 38 that defines one or more apertures for receiving a coupling element such as a clamp, bracket or other device that may be used to facilitate the lowering and raising of underwater cable cutter 10 into and out of the water. The shape of the flange 38 may, of course, vary as well as the devices and securing means used to raise and lower underwater cable cutter 10 into and out of water.

Referring to FIGS. 1 and 3, base 18 of underwater cable cutter 10 also includes a sacrificial anode 40. Anode 40 may be constructed of zinc, as well as of other suitable sacrificial material such as magnesium, for example. The utilization of anode 40 permits the corrosion of other components of underwater cable cutter 10 to be substantially reduced, thereby extending the service life of cutter 10.

Referring now to FIGS. 2 and 3, a lid 42 is positioned opposite base 18. Lid 42, base 18 and body 16 form a cavity, within which are located piston 12 and piston rod 14. Lid 42 defines lid aperture 34, designed to receive exterior actuator 30 or interior actuator 32. A lid seal 44 is used to impede water from entering the interior of body 16 at this interface. Lid seal 44 may be an O-ring, D-ring or other type of suitable sealing element. A piston seal 46, which may be an O-ring, D-ring or other type of suitable sealing element, is located within base 18 around piston rod 14. The piston seal 46 impedes water from entering into the hollow interior of the body 16 when the piston rod 14 is stationary and when piston rod 14 is actuated. Piston 12 is bolted to piston rod 14 by a suitable fastener, such as a threaded bolt, for example.

In one embodiment piston 12 is fitted with two sealing rings 48 that may be O-rings, D-rings or other types of sealing elements that impede the passage of water. It will be appreciated that other numbers of sealing rings 48 may be employed. The sealing rings 48 may be the same diameter and thickness, or they may differ in diameter and thickness.

A lid retainer 50 secures lid 42 to body 16. As shown in FIGS. 1-3, lid retainer 50 may in one embodiment comprise three curved elements that are bolted or otherwise fastened around body 16 and lid 42. Of course, lid retainer 50 may comprise less than or more than three elements. In the representative embodiment shown, fasteners 52 are used to secure the lid retainer 50 to the body 16. Fasteners 52 are also used to secure anode 40 to base 18, cutting element 20 to piston rod 14, piston 12 to piston rod 14, and cutting element 20 to a pivot pin 54. These fasteners may be bolts or any other types of suitable fastening elements.

As shown in FIGS. 1 and 2, piston rod 14 is attached to piston 12 (FIG. 2) and to one end of cutting element 20 at cutting element slot 56 (FIG. 1). Cutting element 20 is also attached to base 18 such as by pivot pin 54. As shown in FIGS. 1 and 3, two pin supports 58 extend from base 18 and each include an aperture for pivotally receiving pivot pin 54. Pin supports 58 may be integral to base 18, or they may be welded or otherwise affixed to the base. Pivot pin 54 is moveably secured to pin supports 58 by a pin fastener 60, which may comprise a C-ring, lock washer, or other type suitable device.

Pivot pin 54 allows elongate lever cutting element 20 to pivot about pivot pin 54 while remaining attached to base 18. Cutting element 20 includes a cutting edge or surface 62, as shown in FIG. 4, that is located at the end of cutting element 20 that lies adjacent to pivot pin 54. Cable holder 24 is also mounted to base 18 and, as shown in FIGS. 1 and 2, includes a cable opening-recess 64 for receiving cable 36. As shown in FIG. 4, cable 36, which may also be a wire or line, is positioned in cable opening 64. Cable locks 26 are then secured to cable holder 24 by fasteners 52 to thereby capture cable 36 within cable opening 64.

Referring now to FIGS. 1-3, water is introduced into water chamber 22, this chamber being formed by lid 42, body 16 and piston 12. This introduction is permitted upon the activation of either exterior actuator 30 or interior actuator 32, both of which are located in lid aperture 34.

In one embodiment, wherein an exterior actuator 30 is employed, the exterior actuator may be removed via a buoy attached to the actuator by a cable or directly by a cable (neither shown) so that when the actuator 30 is pulled free from lid 42, water is allowed to pass through lid aperture 34. Alternatively, in another embodiment, an interior actuator 32 may be employed, this interior actuator also being positioned in lid aperture 34. An acoustic release, designed to function upon receiving an acoustic signal, may be made integral with interior actuator 32. Upon receiving a designed acoustic signal, interior actuator 32 separates from lid aperture 34 so that water pressure forces the interior actuator into the interior of body 16. Consequently, water is allowed to push against piston 12 thereby moving the piston and attached piston rod 14 toward base 18. It will be appreciated that other methods may be employed to seal, and subsequently un-seal lid aperture 34.

When water is introduced into water chamber 22, the water pressure forces piston 12 away from lid 42 and towards base 18, thereby decreasing the size of air chamber 28. For example, in one embodiment of cable cutter 10, body 16 may have an internal volume of approximately 43 cubic inches, and the surface area of piston 12 is approximately 10 square inches. It will be appreciated that the internal volume of body 16, the surface area of piston 12, and other dimensions of the cable cutter 10 may vary from these example dimensions.

When piston 12 is driven by water pressure, cutting element 20 pivots about pivot pin 54 and piston rod 14 pushes the other end of cutting element 20 from base 18 (these actions shown by arrows in FIG. 1). Cutting element slot 56 allows relative movement between piston rod 14 and the elongate lever cutting element 20. As cutting element 20 pivots about pivot pin 54, cutting edge 62 moves toward base 18. This leveraged cutting action thereby cuts cable 36 located in cable opening 64. Put differently, as water pressure pushes on the piston 12, the piston rod 14 is also pushed. Rod 14 is attached to cutting element 20 at cutting element slot 56. As piston rod 14 moves in this fashion, cutting element 20 pivots about pivot pin 54 and thereby moves cutting edge 62 towards base 18. As cable 36 is located in cable opening 64, and as elongate lever cutting element 20 rotates, cutting edge 62 cuts the cable.

Because water pressure is used as an operating force to cut the cable, the underwater cable cutter disclosed herein is reliable, and circumvents a more complex hydraulic system as well as avoids the inherent complexities of dangerous explosives. Body 16, base 18, lid 42, cutting element 20, piston 12, piston rod 14, lid retainer 50, cable holder 24, cable lock 26, and other components of the underwater cable cutter 10 may be constructed of metal, metal alloys (such as steel and stainless steel), plastics, silicone rubber, and other suitable elements.

Thus, it is seen that an apparatus and method for cutting a cable located underwater is provided. While specific embodiments have been described, it is evident that many alternatives, modifications, permutations and variations will become apparent to those of ordinary skill in the art in light of the foregoing description. Obviously, many modifications and variations are possible in light of the above description. It is therefore to be understood that within the scope of the claims the inventions may be practiced otherwise than as has been specifically described.

What is claimed is:

1. An underwater cable cutter, comprising:
   a substantially cylindrical hollow body, with a lid at one end thereof and a base at the other end thereof;
   a piston located within the substantially cylindrical hollow body;
   a piston rod having a first end and a second end, the piston rod coupled to the piston at the first end; and
   a cutting element pivotally coupled at the second end of the piston rod and also pivotally coupled to the base;
   wherein water introduced into the substantially cylindrical hollow body moves the piston, thereby moving the piston rod and the cutting element.

2. The apparatus of claim 1, further comprising a lid coupled to the substantially cylindrical hollow body, the lid including an aperture and an actuator removeably positioned in the aperture.

3. The apparatus of claim 1, wherein the cutting element comprises a cutting lever arm including a cutting surface.

4. The apparatus of claim 1, further comprising a cable holder coupled to the base that is coupled to the substantially cylindrical hollow body, the cable holder structured to receive a cable.

5. The apparatus of claim 4, wherein when the water is introduced into the substantially cylindrical hollow body and moves the piston, thereby moving the piston rod and the cutting element, the cutting element cuts a cable located in the cable holder.

6. The apparatus of claim 1, further comprising an anode coupled to a base that is coupled to the substantially cylindrical hollow body.

7. The apparatus of claim 1, wherein the second end of the piston rod extends through an aperture in the base, and pivotally couples to the cutting element.

* * * * *